United States Patent [19]

Terry et al.

[11] Patent Number: 4,671,934

[45] Date of Patent: Jun. 9, 1987

[54] AMINOPHOSPHONIC ACID/PHOSPHATE MIXTURES FOR CONTROLLING CORROSION OF METAL AND INHIBITING CALCIUM PHOSPHATE PRECIPITATION

[75] Inventors: John P. Terry; Oscar W. May, both of Memphis, Tenn.

[73] Assignee: Buckman Laboratories, Inc., Memphis, Tenn.

[21] Appl. No.: 853,612

[22] Filed: Apr. 18, 1986

[51] Int. Cl.$^4$ .................... C23F 11/16; C02F 1/00; C09K 3/00

[52] U.S. Cl. ........................... 422/15; 210/697; 210/700; 252/181; 252/389.22; 252/180

[58] Field of Search .................. 422/15; 210/697, 700; 252/181, 180, 389.22

[56] References Cited

U.S. PATENT DOCUMENTS

| | | |
|---|---|---|
| 3,714,066 | 1/1973 | King et al. . |
| 3,723,333 | 3/1973 | von Freyhold . |
| 3,738,806 | 6/1973 | Feiler, Jr. . |
| 3,816,333 | 6/1974 | King et al. ...................... 252/389.22 |
| 3,837,803 | 9/1974 | Carter et al. . |
| 3,992,318 | 11/1976 | Gaupp et al. . |
| 4,029,577 | 6/1977 | Godlewski et al. . |
| 4,105,581 | 8/1978 | Sexsmith . |
| 4,217,216 | 8/1980 | Lipinski .......................... 252/181 X |
| 4,222,779 | 9/1980 | Bengali et al. .............. 252/389.22 X |
| 4,303,568 | 12/1981 | May et al. . |
| 4,317,744 | 3/1982 | Levi . |
| 4,406,811 | 9/1983 | Christensen et al. . |
| 4,437,898 | 3/1984 | Drosdziok et al. ........ 252/389.22 X |
| 4,551,262 | 11/1985 | Samakaeu et al. .............. 210/700 X |

FOREIGN PATENT DOCUMENTS

| | | | |
|---|---|---|---|
| 91763 | 10/1983 | European Pat. Off. ........ | 252/389.22 |
| 1201334 | 8/1970 | United Kingdom .......... | 252/389.22 |

*Primary Examiner*—John F. Terapane
*Assistant Examiner*—Matthew A. Thexton
*Attorney, Agent, or Firm*—Finnegan, Henderson, Farabow, Garrett & Dunner

[57] ABSTRACT

A method of controlling the corrosion of a metal surface in contact with an aqueous system while at the same time preventing the precipitation of potentially scale-forming calcium phosphate. The water in such systems is treated with a combination of a source of orthophosphate ion and a mixture of methylene phosphonic acid derivatives of $C_6$ diamines, or the salts thereof. A composition for preventing the precipitation of calcium phosphate containing a mixture of methylene phosphonic acid derivatives of $C_6$ diamines or the salts thereof.

16 Claims, No Drawings

AMINOPHOSPHONIC ACID/PHOSPHATE MIXTURES FOR CONTROLLING CORROSION OF METAL AND INHIBITING CALCIUM PHOSPHATE PRECIPITATION

BACKGROUND OF THE INVENTION

This invention relates to a method for inhibiting the corrosion of metal surfaces, preferably iron and iron alloys and more preferably low carbon steel, in contact with an aqueous system, preferably a cooling water or related water-handling system, and preventing the precipitation in such systems of scale-forming calcium salts, particularly calcium phosphate.

Aqueous systems, such as cooling water and related water-handling systems, include cooling towers and associated pumps, heat exchangers, and pipelines, heating systems, gas scrubbing systems and other similar systems. Problems commonly encountered in these water handling systems include not only the electrochemical corrosion of iron and iron alloys in contact with the circulating water but also the precipitation of potentially scale-forming calcium salts. These two processes are, in fact, very closely related because methods of chemical treatment intended to control one of these problems often aggravate the difficulty caused by the other.

However, we have discovered a method and composition for treating the water in such systems that can both inhibit corrosion and prevent the precipitation of scale-forming calcium salts. It is believed that our method and composition can be effective over a wider range of water conditions than are the methods of the prior art, and the objectives of the invention can be achieved without the negative impact on the environment of some of the prior methods.

For many years, the most common method of controlling corrosion in cooling water and related water-handling systems was to treat the water with hexavalent chromium salts, such as sodium chromate. At the same time, scaling due to slightly soluble calcium salts was prevented by treating the water with mineral acids, such as sulfuric acid, to keep the pH low enough to prevent the precipitation of the scale-forming calcium salts. Improvements in this technology over the years included the use of zinc salts and phosphates in combination with the chromates, which could provide good corrosion control at reduced chromate concentrations. However, because of environmental concerns over the discharge of even small amounts of hexavalent chromium in cooling water effluents, new methods continued to be sought that would provide total corrosion inhibition without the use of hexavalent chromium.

Some of the ways that this has been achieved include the use of various combinations of zinc salts, phosphates, polyphosphates, and organic phosphonic acid derivatives and their salts. However, all of these methods in the prior art have certain disadvantages, such as requiring close control of the pH to keep it within a very narrow range or using special additives or dispersants to prevent the precipitation of scale-forming salts like calcium phosphate.

One commonly used method of cooling water treatment is described by Geiger and May in U.S. Pat. No. 4,305,568. In the Geiger and May patent, it is said at col. 10, beginning at line 9, that the aqueous medium must have a pH of 5.5 and above and must also contain calcium ion concentrations, preferably about 15 parts per million. The compositions disclosed in the Geiger and May patent contain a water soluble orthophosphate, a water-soluble polymer composed primarily of moieties derived from acrylic acid and moieties derived from an hydroxy lower alkyl acrylate. Water-soluble organophosphonic acid derivatives may also be included.

In the Geiger and May method, as practiced, relatively high concentrations of the orthophosphate are maintained in the circulating water to inhibit corrosion by passivating ferrous alloy surfaces in contact with the water, and the formation of calcium phosphate scale is inhibited by the simultaneous use of the copolymers of acrylic acid and hydroxyalkyl acrylates. The latter copolymers were reported by Godlewski in U.S. Pat. No. 4,029,577 to be effective antiprecipitants for calcium phosphate. As we understand it, the main disadvantages of the method of Geiger and May in practice are that it requires the use of relatively high concentrations of orthophosphate and careful control of the calcium concentration in the system. Such requirements complicate trouble-free control of the system.

Another type of method of corrosion control that avoids the problem of calcium phosphate deposition involves the use of what is known in the art as "all organic" corrosion inhibitors. Technology of this type is described in U.S. Pat. Nos. 4,317,744 and 4,406,811. In this type of method, corrosion control is obtained by using organic phosphonic acids (or blends of phosphonic acids) along with aromatic azoles and various water-soluble polymers (polyacrylic acid, polymethacrylic acid). No calcium phosphate precipitation can occur because no orthophosphate is present in the treatment. However, as we understand it, in practice, methods of this type give limited corrosion protection and require relatively large amounts of inhibitor, and thus have limited economic feasibility.

Despite the limitations of the existing "all organic" inhibitors, organic phosphonic acids and phosphonates have been found effective as corrosion inhibitor components when used in combination with other substances. The evolution of phosphonic acid corrosion control technology began with the direct application of phosphonic acids or their water-soluble salts as corrosion inhibitors. The disadvantages of this technology were twofold. First, the phosphonic acids or phosphonates commonly available required very high feedrates to obtain acceptable corrosion inhibition. In addition, localized corrosion, known in the art as "pitting", could result from insufficient passivation due to poor film formation when the phosphonic acids were used alone.

This problem was recognized by Carter (U.S. Pat. No. 3,837,803) who overcame it by utilizing orthophosphate with a water-soluble organo-phosphonic acid compound selected from a wide range of phosphonic acids. However, Carter acknowledged two significant restrictions in the use of his method. First, as explained at column 3, beginning at line 4, the cooling water has to contain at least 50 ppm of calcium ion to allow the use of this method without the supplemental addition of a metal cation of the group zinc, nickel, cobalt, cadmium or chromium. The undesirable environmental impact of these heavy metal cations is significant, and, as Carter pointed out, governmental regulations often require that they be avoided in effluents. In the teachings of Carter at column 3, one way of getting around the use of these metal cations, at least in systems containing more than 4 ppm of calcium, is to maintain system pH in the range of 8.5 to 9.0. However, as pointed out by Carter at column 3, lines 34-37, this high pH can lead to the delignification of cooling tower wood and may require the supplemental feed of alkali, both of which are undesirable.

A second major drawback of the method of Carter is his statement at col. 3, lines 60-65, that it is desirable to use very tight pH controls when calcium concentrations exceed 80 ppm. Specifically, Carter suggests a pH between 7.1 and 7.5 when calcium ion exceeds this level. This is a very significant disadvantage in almost all systems, because calcium levels often vary over broader ranges than 50 to 80 ppm. Carter requires one narrow pH range for calcium concentrations below 50 ppm and suggests a different but still narrow pH range for calcium concentrations above 80 ppm. Also, when calcium is above 80 ppm, the suggested restriction of pH to the 7.1-7.5 range is difficult to maintain on a consistent basis in most practical operating cooling water systems.

Other combinations of phosphonic acids and inorganic compounds are also mentioned in the prior art. Polyphosphates and polyacrylic acids were combined with phosphonic acids by Gaupp (U.S. Pat. No. 3,992,318). Polyphosphates and polymaleic anhydride or polymaleic acid were combined with phosphonic acids by Sexsmith (U.S. pat. No. 4,105,581). However, because polyphosphates revert in time to orthophosphates, it is believed that, in practice, these methods also cause problems with calcium phosphate precipitation.

We have discovered a new way of overcoming the problems of, and obviating the disadvantages of the prior art. We have found that use of a certain combination of phosphonic acids (or their water-soluble salts) along with orthophosphate, preferably in low concentrations, will provide good corrosion inhibition and simultaneously inhibit the precipitation of calcium phosphate. The present invention, moreover, is effective in both high and low pH waters and in waters with either low or high concentrations of calcium.

SUMMARY OF THE INVENTION

The present invention is directed to a method for controlling corrosion of metal surfaces in contact with an aqueous system, and simultaneously inhibiting the precipitation of calcium phosphate, comprising the step of treating the aqueous system with a source of orthophosphate ion and a mixture of (1) 1,2-diaminocyclohexanetetrakis(methylene phosphonic acid) or a salt thereof; (2) 2-methyl-1,5-pentanediaminetetrakis(methylene phosphonic acid) or a salt thereof; and (3) 1,6-hexanediaminetetrakis(methylene phosphonic acid), or a salt thereof in amounts effective to control corrosion of the metal surfaces in contact with the aqueous system and to inhibit the precipitation of calcium phosphate.

The present invention also relates to a composition for controlling corrosion of a metal surface in contact with an aqueous system and simultaneously inhibiting the precipitation of calcium phosphate comprising a source of orthophosphate ion and a mixture of (1) 1,2-diaminocyclohexanetetrakis(methylene phosphonic acid) or a salt thereof; (2) 2-methyl-1,5-pentanediaminetetrakis (methylene phosphonic acid) or a salt thereof; and (3) 1,6-hexanediaminetetrakis(methylene phosphonic acid), or a salt thereof, in amounts effective to control corrosion of the metal surface in contact with the aqueous system and to inhibit the precipitation of calcium phosphate.

The present invention also relates to a composition for preventing the precipitation of calcium phosphate comprising a mixture of (1) 1,2-diaminocyclohexanetetrakis(methylene phosphonic acid) or a salt thereof; (2) 2-methyl-1,5-pentanediaminetetrakis(methylene phosphonic acid) or a salt thereof; and (3) 1,6-hexanediaminetetrakis(methylene phosphonic acid) or a salt thereof in amounts effective to prevent precipitation of calcium phosphate.

Low concentrations of orthophosphate can advantageously be used in the present invention, which reduces the chance of calcium phosphate scale formation. In addition, the combination of phosphonic acids utilized in the present invention is effective both as a corrosion inhibitor and as an antiprecipitant for inhibiting the precipitation of calcium phosphate and other insoluble calcium salts. Unlike the method of Carter as taught in U.S. Pat. No. 3,837,803, the present invention, utilizing a source of orthophosphate ion and the mixture of methylene phosphonic acids described above, does not require close control of the pH or the supplemental addition of heavy metal cations. Unlike the method of Geiger and May, as well as that of Carter, the present invention does not require close control of the calcium concentration.

DETAILED DESCRIPTION OF THE PREFERRED EMBODIMENTS

The metal surface may be an iron or iron alloy surface, preferably a ferrous alloy. More preferably, the metal surface is a low carbon steel surface. Preferably, the aqueous system is a cooling water system.

The organic phosphonic acids utilized in this invention may be manufactured from the corresponding diamines. These diamines all have 6 carbon atoms in their structures and include 1,2-diaminocyclohexane, 2-methyl-1,5-pentanediamine, and 1,6-hexanediamine, all of which are commercially available. The phosphonic acid derivatives are produced through the following phosphonomethylation reaction:

$$R\begin{matrix}NH_2\\ \\NH_2\end{matrix} + 4HCHO + 4H_3PO_3 \longrightarrow$$

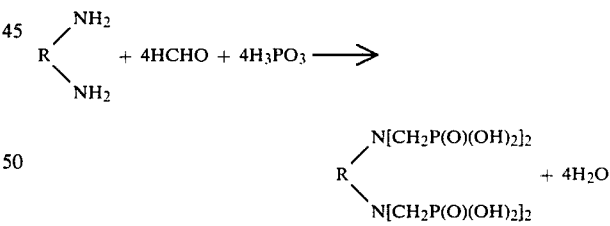

where R represents the C6 radicals of the diamines listed above. Hydrochloric acid is usually added to the reaction mixture to suppress the oxidation of phosphite to phosphate. As recited above, the phosphonic acids may be used in salt form. Preferred salts include the sodium, potassium, and ammonium salts of these acids, which salts are formed by partially or completely neutralizing them with sodium hydroxide, potassium hydroxide, or ammonium hydroxide, respectively.

To accomplish the objectives of this invention, a mixture of the methylene phosphonic acids and/or their salts is used in combination with a source of orthophosphate ion to treat the water in aqueous systems. The amount of phosphonic acid mixture (100% basis) added to the water should be in the range of 1 to 100 parts per million (ppm), preferably from 3 to 100 ppm, more preferably from 3 to 50 ppm, most preferably from 9–15 ppm, based on the total weight of water in the system. The amount of orthophosphate compound added should be sufficient to provide 0.5 to 50 ppm orthophosphate as $PO_4$, preferably from 1 to 9 ppm, more preferably from 3 to 5.2 ppm, based on the total weight of water in the system.

The weight ratio of the orthophosphate ion to the phosphonic acid mixture is 1:200 to 50:1, preferably 0.1:1 to 10:1, more preferably 1:2.4 to 1:3.3.

Representative sources of orthophosphate ion suitable for use in this invention include phosphoric acid (orthophosphoric acid), the sodium orthophosphates, the potassium orthophosphates, the lithium orthophosphates, the ammonium orthophosphates, the organic amine salts of phosphoric acid, and the organic orthophosphates set forth in U.S. Pat. No. 3,510,436. Exemplary lithium, sodium, potassium and ammonium orthophosphates include lithium di acid phosphate, trisodium orthophosphate, disodium orthophosphate, monosodium orthophosphate, hemisodium orthophosphate, tripotassium orthophosphate, dipotassium orthophosphate, monopotassium orthophophate, triammonium orthophosphate, diammonium orthophosphates and monoammonium orthophosphate.

The methylene phosphonic acid mixture and the source of orthophosphate ion can be added separately and individually to the water system to be treated, but it is preferable to mix all of these materials prior to addition to the water. If necessary, the combined mixture can be diluted with water and/or stabilized by the additional of adjuvants to keep the mixture from separating prior to its addition to the water system to be treated. Other compatible water treatment components, such as biocides, antifoulants, and dispersants, can also be added to the mixture.

In a preferred embodiment of the invention, the methylene phosphonic acid mixture produced as described above is analyzed for both total phosphonic acids and total inorganic phosphate. Then phosphoric acid is added to the mixture until the concentration of orthophosphate as $PO_4$ reaches the desired ratio to the total weight of methylene phosphonic acids in the mixture. This mixture can then be diluted with water to any convenient use concentration. The mixture can also be formulated with other types of water treatment compounds.

To disclose the nature of this invention even more clearly, the following illustrative examples will be given. It is understood, however, that the invention is not to be limited to the specific conditions or details set forth in these representative examples.

In determining the corrosion inhibition provided by the compositions and methods of our invention one of the techniques used was the Spinning Disk Test Method, a testing procedure that is widely employed, with many variations, in evaluating the effectiveness of corrosion inhibitors for cooling water treatment. In the Spinning Disk Test Method, a plastic disk is attached to the end of a plastic stirrer shaft. Metal test coupons are mounted vertically on this disk, usually two coupons per test. The shaft is fastened vertically in a stirrer motor chuck, and the disk and attached coupons are immersed in water contained in a 4-liter plastic cylindrical tank, which is surrounded by a constant temperature bath.

The water volume in the cylindrical tank is maintained at a level that will keep the disk and coupons covered when the stirrer is started and the disk is rotated. The rotation speed of the disk is controlled at 100 rpm so that erosion and velocity effects are kept equal in all tests. The water is automatically replenished from a reservoir, with the addition being controlled with a timer and solenoid valve, at the rate of 60 milliliters of water added every 30 minutes. Excess water overflows through a special outlet to a drain. The cylindrical tank is kept covered except for the hole for the stirrer shaft to minimize evaporation losses.

The composition of the water is controlled to simulate the water conditions in typical cooling water and other water-handling systems. The inhibitor being tested is added to this water in an appropriate concentration. For control purposes, tests are run in water with the same composition to which no inhibitor has been added.

The metal coupons are cleaned and weighed on an analytical balance before and after exposure to the water. As a rule, the exposure time is at least five days (120 hours). The corrosion rate is calculated from the loss in weight of the coupons, the exposed area of the coupons, the density of the metal, and the time of exposure. The rate is expressed as mils (of thickness) lost per year (mpy). The percent inhibition of corrosion obtained with a given concentration of an inhibitor is calculated from the corrosion rate with this concentration of inhibitor added to the water compared to the corrosion rate in the same water containing no inhibitor, using the following formula:

$$\% \text{ Corrosion Inhibition} = \frac{(mpy \text{ Corrosion w/o Inhibitor} - mpy \text{ Corrosion with Inhibitor}) \times 100}{(myp \text{ Corrosion w/o Inhibitor})}$$

Another method we used in evaluating corrosion inhibition efficacy involved treating the water in a Continuous Circulation Test Loop with the corrosion inhibitors to be checked. The Test Loop system consists of a 100-gallon reservoir, a circulation pump, a flow control valve, a rotameter, pipelines in which corrosion test coupons are mounted, and instruments for controlling the temperature and pH and monitoring other system variables such as the dissolved oxygen level. The water is pumped from the reservoir at a controlled rate through the pipeline containing the test coupons and then back to the reservoir. The corrosion rate in this system is determined by the weight loss of the test coupons, and the calculation of the percent corrosion inhibition is done in the same way as described for the Spinning Disk Test Method.

EXAMPLE 1

A 1-liter, 3-neck glass reaction flask was fitted with an agitator, a reflux condenser, and a thermometer and placed in a cooling water bath to which ice could be added as needed to control the temperature of the contents of the flask. To this flask were charged 234.3 g of 70% phosphorous acid. To the acid were added, slowly to avoid overheating, 57.5 g of a mixture of diamines composed of approximately equimolar amounts of 1,6-diaminocyclohexane, 2-methyl-1,5-pentanediamine, and 1-6-hexanediamine. The temperature was controlled during the reaction to keep it below 70° C., and the mixture was stirred continuously. After the diamines were added, 98.6 g of concentrated (37.5%) hydrochloric acid were added to the reaction flask, and the mixture was heated to 90°-95° C.

Next, 174.3 g of a 37% formaldehyde solution were added slowly to the reaction mixture over a period of 1¾ hours. The mixture was stirred and maintained at 90°-95° C. for an additional 2 hours. The mixture was allowed to cool to 25° C. before being analyzed for its total phosphonic acid content and orthophosphate content. The reaction yielded 560 g of solution containing 35.8% by weight of C6 diamine tetrakis(methylene phosphonic acid) mixture, based on an average molecular weight of 492, and 0.15% orthophosphate as $PO_4$. This solution was used as the source of the phosphonic acids in the tests described in the following examples.

EXAMPLE 2

A combination of orthophosphate with the phosphonic acids prepared as described in Example 1 was tested as a corrosion inhibitor using the Spinning Disk Test Method previously described. The source of the orthophosphate ions was phosphoric acid, which was blended with the phosphonic acids prior to addition to the water. The synthetic cooling water ion concentrations, test conditions, and results of this evaluation are shown in Table 1. The concentrations of phosphonic acids and orthophosphate are expressed as the amounts of active ingredients present in the water. The results show that very low concentrations of a corrosion inhibitor prepared according to our invention provide excellent corrosion protection to mild steel in a high calcium, high pH water with a composition typical of a large number of practical operating cooling water systems. A concentration of the corosion inhibitor equivalent to 14.6 mg/L (ppm) of the diamine phosphonic acids and 4.6 mg/L orthophosphate as $PO_4$, provided 96.2% corrosion inhibition, and a concentration equivalent to 9.7 mg/L of the phosphonic acids and 3.0 mg/L $PO_4$ provided over 93% corrosion inhibition.

TABLE 1

| ION CONCENTRATIONS: | |
| --- | --- |
| Calcium as $Ca^{++}$ | 80 mg/L (ppm) |
| Magnesium as $Mg^{++}$ | 60 mg/L |
| Bicarbonate ion as $HCO_3^-$ | 125 mg/L |
| Chloride ion as $Cl^-$ | 300 mg/L |
| Sulfate as $SO_4^{--}$ | 300 mg/L |
| TEST CONDITIONS: | |
| pH | 8.0 |
| Temperature | 40° C. |
| Rotational Speed | 100 rpm |
| Duration of Test | 144 hours |
| Test coupons: | c-1010 low carbon steel |

| TEST RESULTS: | | |
| --- | --- | --- |
| Phosphonic Acids mg/L | $PO_4$ mg/L | Corrosion Rate mpy |
| 0 (Control) | 0 | 49.7 |
| 14.6 | 4.6 | 1.9 |
| 9.7 | 3.0 | 3.2 |
| 4.9 | 1.5 | 7.6 |

EXAMPLE 3

To demonstrate the effectiveness of the corrosion inhibitors of our invention in a low calcium, low pH system, a composition containing the phosphonic acids and phosphate was tested in the Continuous Circulation Test Loop described previously. In the Test Loop, an automatic controller keeps the pH at a fixed value throughout the period of the test. The composition tested again used the phosphonic acids prepared as described in Example 1 to which was added phosphoric acid as the orthophosphate source. The synthetic cooling water ion concentrations, test conditions, and results of this evaluation are shown in Table 2. These results clearly demonstrate that excellent inhibition of corrosion can be obtained in this rather corrosive water with a relatively low concentration of a corrosion inhibitor prepared according to our invention. The corrosion rate of mild steel was reduced from 63 mpy to 2.8 mpy, which is equivalent to 95.6% corrosion inhibition.

TABLE 2

| ION CONCENTRATIONS: | |
| --- | --- |
| Calcium as $Ca^{++}$ | 10 mg/L (ppm) |
| Magnesium as $Mg^{++}$ | 60 mg/L |
| Bicarbonate ion as $HCO_3^-$ | 125 mg/L |
| Chloride ion as $Cl^-$ | 300 mg/L |
| Sulfate as $SO_4^{--}$ | 300 mg/L |
| TEST CONDITIONS: | |
| pH | 7.0 |
| Temperature | 40° C. |
| Water velocity (over coupons) | 3.6 ft/sec |
| Duration of Test | 143 hours |
| Test coupons: | c-1010 low carbon steel |

| TEST RESULTS: | | |
| --- | --- | --- |
| Phosphonic Acids mg/L | $PO_4$ mg/L | Corrosion Rate mpy |
| 0 (Control) | 0 | 63.0 |
| 32.5 | 11.5 | 2.8 |

EXAMPLE 4

The effectiveness of the combination of phosphonic acids of our invention in preventing the precipitation of calcium phosphate was demonstrated by an antiprecipitation test. The combination of phosphonic acids prepared as described in Example 1, designated Composition A, was used for these tests. For comparison, similar tests were run with two other individual phosphonic acids that are widely used in the treatment of cooling water. These are aminotris(methylene phosphonic acid), commonly called AMP, and 1-hydroxyethylidene-1,1-diphosphonic acid, commonly called HEDP. Calcium phosphate precipitation inhibition was measured by adding a calcium chloride solution and a disodium hydrogen phosphate solution in amounts that provided 160 mg/L calcium ion as Ca and approximately 10 mg/L phosphate ion as $PO_4$. The appropriate amount of phosphonic acid inhibitor was added, and the solution pH was adjusted to 8.5. The treated sample was capped and placed in an oven at 50° C. for 24 hours. After removal from the oven, a portion of the supernatant liquid from each bottle was taken, filtered through a 0.45 micrometer pore size filter to remove any precipitated calcium phosphate, and analyzed for orthophosphate. As a "Blank", a sample was prepared in the same way except that the pH was not adjusted to the alkaline side but kept on the acid side so that no precipitation would occur. The percent inhibition of precipitation was calculated from the amount of phosphate added (Blank) and the difference between the amount of phosphate in solution in samples without inhibitor (Control) compared to those with inhibitor, using the following formula:

% Inhibition =

$$\frac{(\text{mg/L } PO_4 \text{ with Inhibitor} - \text{mg/L } PO_4 \text{ in Control}) \times 100}{(\text{mg/L } PO_4 \text{ in Blank} - \text{mg/L } PO_4 \text{ in Control})}$$

The results of these antiprecipitation tests, which are shown in Table 3, clearly demonstrate that the combination of phosphonic acids of the present invention provides significantly greater inhibition of the formation of insoluble calcium phosphate than do AMP or HEDP. Inhibitor concentrations in Table 3 show the amount of active ingredient present.

TABLE 3

| Test No. | Inhibitor | Concn. mg/L | PO4 in soln. mg/L | Inhibition % |
|---|---|---|---|---|
| 1 | Control (no inhibitor) | — | 1.1 | — |
|   | Blank | — | 9.7 | — |
|   | Composition A | 3.0 | 8.3 | 83.7 |
|   | Composition A | 5.0 | 8.3 | 83.7 |
| 2 | Control | — | 1.7 | — |
|   | Blank | — | 9.5 | — |
|   | HEDP | 3.0 | 5.7 | 51.3 |
|   | HEDP | 5.0 | 6.1 | 60.3 |
| 3 | Control | — | 0.9 | — |
|   | Blank | — | 9.8 | — |
|   | AMP | 3.0 | 7.0 | 68.5 |
|   | AMP | 5.0 | 6.2 | 59.6 |

EXAMPLE 5

To demonstrate the effectiveness of the corrosion inhibitors of our invention in preventing deposit formation as well as controlling corrosion, a composition containing the phosphonic acids and phosphate was tested in the Continuous Circulation Test Loop described previously. A high calcium, high pH water was used, because this is the type of water in which deposits are more likely to form. The composition tested again used the phosphonic acids prepared as described in Example 1 to which was added phosphoric acid as the orthophosphate ion source. The pH was automatically controlled during the test cycle to keep it on the alkaline, deposit-forming side. The synthetic cooling water ion concentrations, test conditions, and the results of this test are shown in Table 4. The amount of corrosion inhibitor added to the water provided 12.5 mg/L of the phosphonic acids and 5.2 mg/L of PO4. In addition to checking the corrosion inhibition in this test, we also checked the heating elements in the Test Loop system for deposition of calcium phosphate or other deposits. No measurable deposits were formed, even though, as mentioned previously, the water had a relatively high concentration of calcium salts and high pH. Therefore the results of this test show that not only did this composition provide good corrosion protection (96.2% inhibition), it also prevented the formation of scale on heated surfaces in what is usually a deposit-forming water.

TABLE 4

| ION CONCENTRATIONS: | |
|---|---|
| Calcium as $Ca^{++}$ | 80 mg/L (ppm) |
| Magnesium as $Mg^{++}$ | 60 mg/L |
| Bicarbonate ion as $HCO_3^-$ | 125 mg/L |
| Chloride ion as $Cl^-$ | 300 mg/L |
| Sulfate as $SO_4^{--}$ | 300 mg/L |
| TEST CONDITIONS: | |
| pH | 8.3 |
| Temperature | 40° C. |
| Water velocity (past coupons) | 3.6 ft/sec |
| Duration of Test | 143 hours |
| Test coupons: | c-1010 low carbon steel |
| TEST RESULTS: | |
|  | Corrosion Rate mpy |
| Control (no inhibitor) | 49.7 |

TABLE 4-continued

| With corrosion inhibitor | 1.9 |
|---|---|

No measurable deposits on heating elements.

What is claimed is:

1. A method for controlling corrosion of a metal surface in contact with an aqueous system and simultaneously inhibiting the precipitation of calcium phosphate comprising the step of treating the aqueous system with a source of orthophosphate ion and a mixture of (1) 1,2-diaminocyclohexanetetrakis(methylene phosphonic acid) or a salt thereof; (2) 2-methyl-1,5-pentanediaminetetrakis(methylene phosphonic acid) or a salt thereof; and (3) 1,6-hexanediaminetetrakis(methylene phosphonic acid) or a salt thereof in amounts effective to control corrosion of metal surfaces exposed to aqueous systems and to inhibit the precipitation of calcium phosphate.

2. The method of claim 1 wherein component (1), component (2), and component (3) each comprises 20 to 40 weight percent of the total weight of the mixture of methylene phosphonic acids.

3. The method of claim 1 wherein the weight ratio of the orthophosphate ion to the methylene phosphonic acid mixture is from about 1:200 to 50:1.

4. The method of claim 3 wherein the weight ratio of the orthophosphate ion to the methylene phosphonic acid mixture is 0.1:1 to 10:1.

5. The method of claim 1 wherein the source of orthophosphate ion is added to the water in an amount that provides a concentration of 0.5 to 50 parts of orthophosphate as $PO_4$ per million parts of water.

6. The method of claim 1 wherein the methylene phosphonic acid mixture is added to the water in an amount that provides a concentration of 1 to 100 parts of the mixture per million parts of water.

7. The method of claim 1 wherein the source of orthophosphate ion is orthophosphoric acid.

8. The method of claim 1 wherein the source of orthophosphate ion is sodium orthophosphate.

9. The method of claim 1 wherein the source of orthophosphate ion is potassium orthophosphate.

10. The method of claim 1 wherein the aqueous system treated is a cooling water system.

11. A composition for controlling corrosion of a metal surface in contact with an aqueous system and simultaneously inhibiting the precipitation of calcium phosphate comprising a source of orthophosphate ion and a mixture of (1) 1,2-diaminocyclohexanetetrakis(methylene phosphonic acid) or a salt thereof; (2) 2-methyl-1,5-pentanediaminetetrakis(methylene phosphonic acid) or a salt thereof; and (3) 1,6-hexanediaminetetrakis(methylene phosphonic acid) or a salt thereof in amounts effective to control corrosion of the metal surfaces in contact with the aqueous system and to inhibit the precipitation of calcium phosphate.

12. The composition of claim 12, wherein component (1), component (2), and component (3) each comprises 20 to 40 weight percent of the total weight of the mixture of methylene phosphonic acids.

13. The composition of claim 12, wherein the weight ratio of the orthophosphate ion to the methylene phosphonic acid mixture is from about 1:200 to 50:1.

14. The composition of claim 13 wherein the weight ratio of the orthophosphate ion to the methylene phosphonic acid mixture is 0.1:1 to 10:1.

15. A composition for preventing the precipitation of calcium phosphate comprising a mixture of (1) 1,2-diaminocyclohexanetetrakis(methylene phosphonic acid) or a salt thereof; (2) 2-methyl-1,5-pentanediaminetetrakis(methylene phosphonic acid) or a salt thereof; and (3) 1,6-hexanediaminetetrakis(methylene phosphonic acid) or a salt thereof in amounts effective to prevent precipitation of calcium phosphate.

16. The composition of claim 15 wherein component (1), component (2), and component (3) each comprises 20 to 40 weight percent of the total weight of the mixture of methylene phosphonic acids.

* * * * *